(12) United States Patent
Herth

(10) Patent No.: US 7,126,058 B2
(45) Date of Patent: Oct. 24, 2006

(54) ADAPTABLE LOW VOLTAGE ELECTRICAL BOX

(76) Inventor: Greg Herth, 10 Tower Mews, Oakdale, NY (US) 11769

( * ) Notice: Subject to any disclaimer, the term of this patent is extended or adjusted under 35 U.S.C. 154(b) by 0 days.

(21) Appl. No.: 11/224,553

(22) Filed: Sep. 12, 2005

(65) Prior Publication Data

US 2006/0070763 A1    Apr. 6, 2006

(51) Int. Cl.
*H01H 9/02* (2006.01)
(52) U.S. Cl. .......................... 174/58; 174/480; 174/57; 174/53; 220/3.2; 220/3.3; 220/3.7; 248/906
(58) Field of Classification Search ................. 174/48, 174/49, 50, 53, 57, 58, 480, 481; 220/3.2, 220/3.3, 3.4, 3.5, 3.6, 3.7, 3.8, 4.02; 439/535, 439/536, 537, 538, 539, 949; 248/906
See application file for complete search history.

(56) References Cited

U.S. PATENT DOCUMENTS

| | | | |
|---|---|---|---|
| 2,730,261 A | 1/1956 | Tutt ........................... | 220/3.7 |
| 2,757,817 A | 8/1956 | Egan ........................... | 220/3.5 |
| 4,788,383 A | 11/1988 | Caison ........................ | 174/54 |
| 5,448,012 A | 9/1995 | Jacob .......................... | 174/48 |
| 5,450,974 A * | 9/1995 | Lippa .......................... | 220/3.8 |
| 5,600,093 A | 2/1997 | Herth et al. .................. | 174/53 |
| 5,773,757 A * | 6/1998 | Kenney et al. ............... | 174/53 |
| 6,093,890 A | 7/2000 | Gretz .......................... | 174/58 |
| D461,455 S | 8/2002 | Forbes ....................... | D13/152 |
| 6,452,098 B1 | 9/2002 | Gretz .......................... | 174/59 |
| 6,452,813 B1 | 9/2002 | Gretz .......................... | 361/826 |
| 6,756,541 B1 | 6/2004 | Mollick ....................... | 174/58 |
| 6,956,169 B1 * | 10/2005 | Shotey et al. ................ | 174/58 |

OTHER PUBLICATIONS

Rack-A-Tiers, "Level Jack", Rack-a-Tiers Mfg., Inc., 2-page website.

* cited by examiner

*Primary Examiner*—Angel R. Estrada
(74) *Attorney, Agent, or Firm*—Alfred M. Walker

(57) ABSTRACT

A low-voltage wiring box includes a pair of substantially parallel side walls wherein each of the side walls has a first end and a second end. The box also includes a top wall and a bottom wall coupling the first ends and the second ends, respectively, of each of the side walls. A pair of interior brackets are on at least on one wall of the side walls, the top wall, and the bottom wall. A reinforcement channel is on the top wall and the bottom wall. Bendable ribs are on a periphery of the side walls. Further, ribs are located on a periphery of at least one of the top wall and the bottom wall. In addition, a hinged-pane support panel is coupled to the side walls via the bendable ribs and to at least one of the top wall and the bottom wall via the ribs.

11 Claims, 13 Drawing Sheets

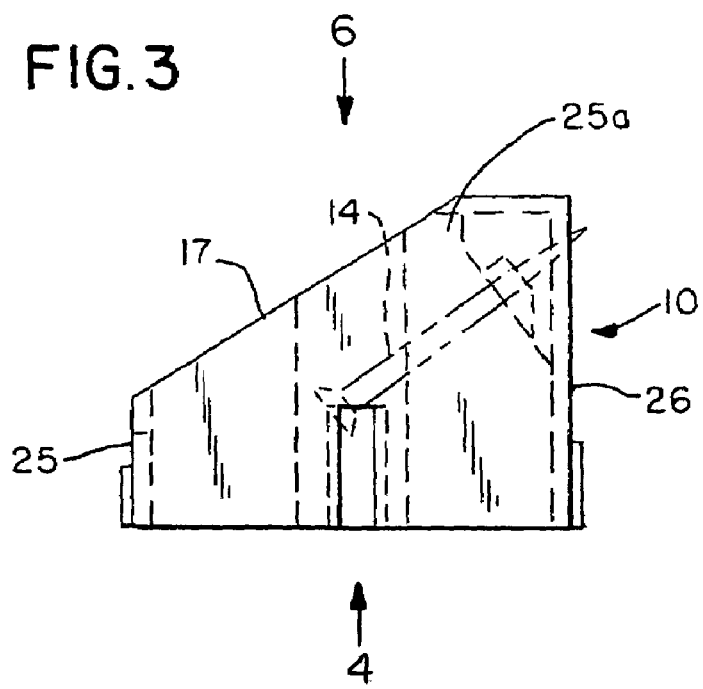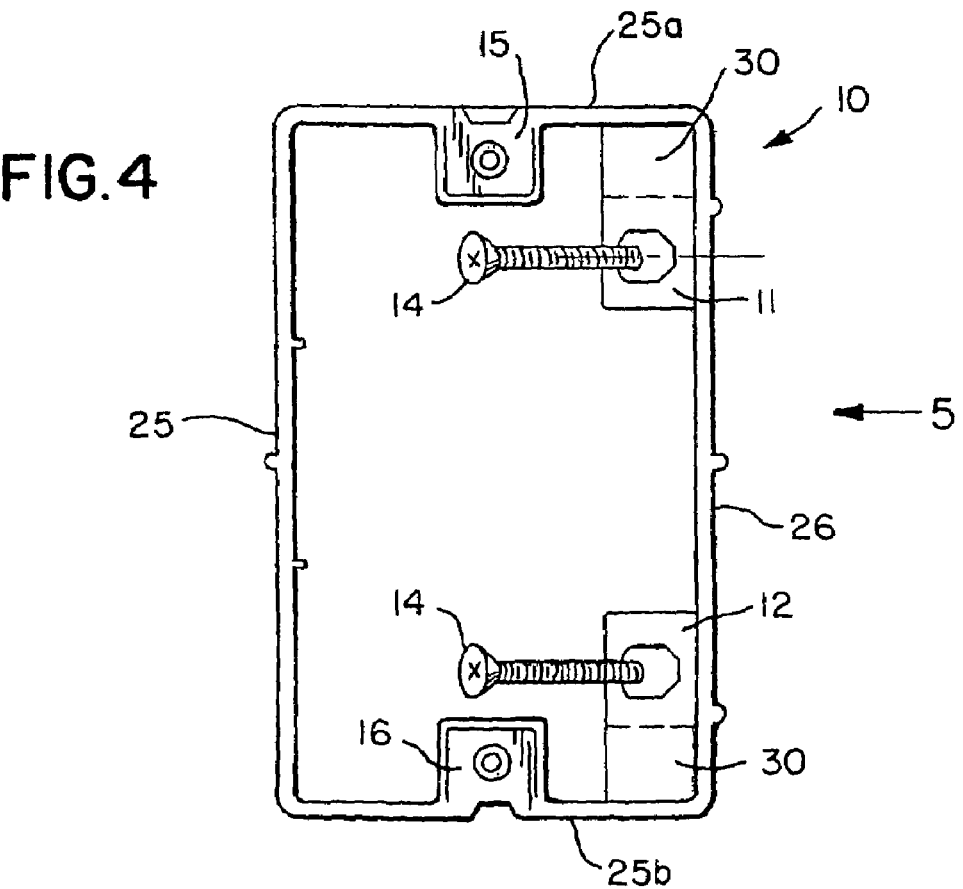

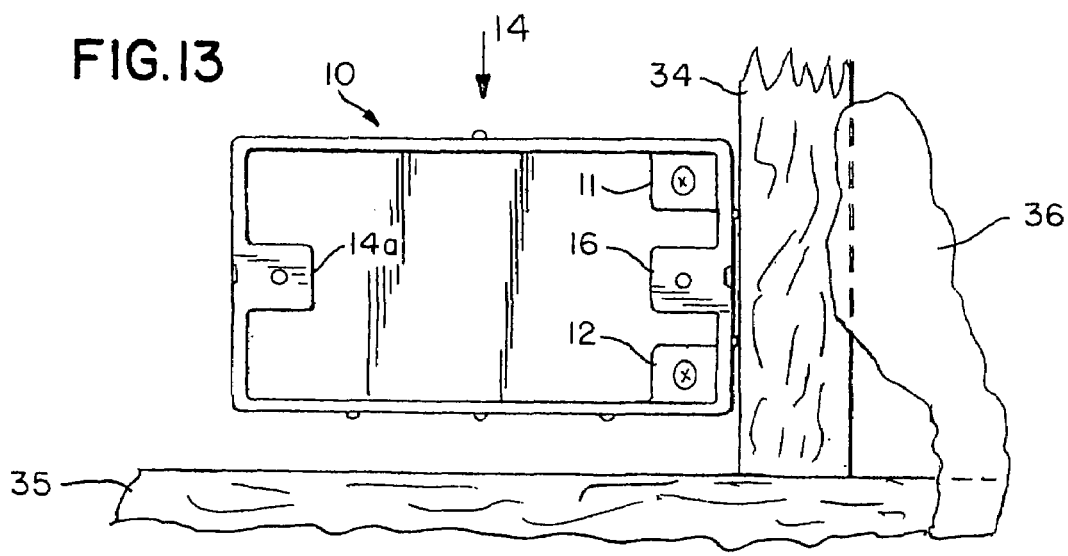
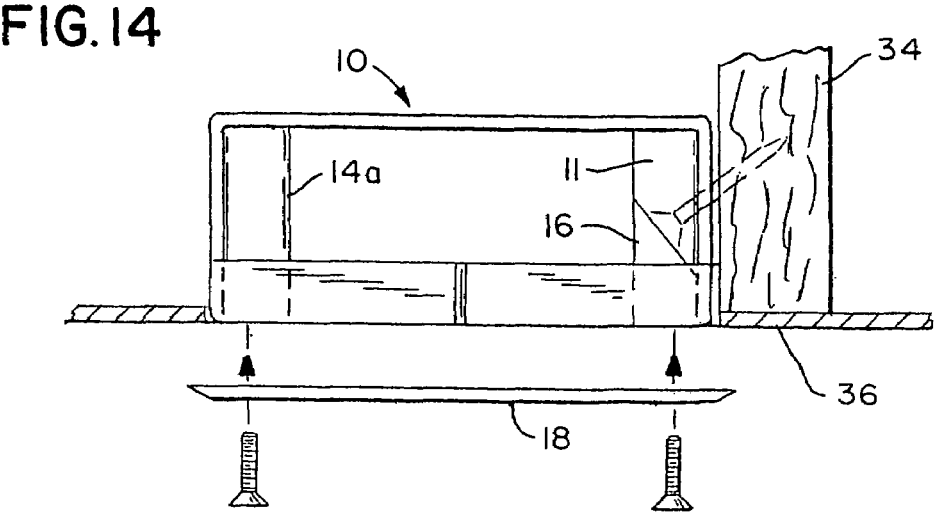
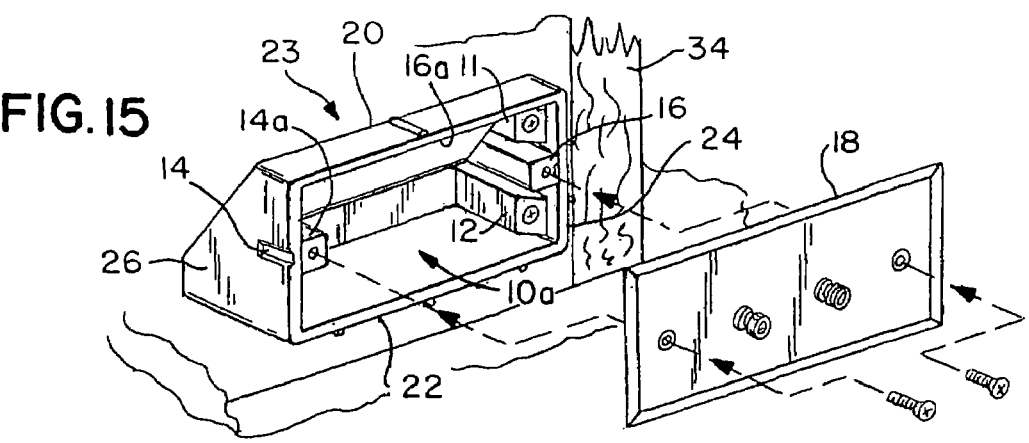

ADAPTABLE LOW VOLTAGE ELECTRICAL BOX

RELATED APPLICATIONS

This application is based in part upon pending application Ser. No. 10/891,706, filed Jul. 15, 2004, and claims priority under 35 USC 120 therefrom. This application is also based in part upon provisional patent application No. 60/488,506 filed Jul. 19, 2003 and claims benefit under 35 USC § 119(e) thereof and priority therefrom.

FIELD OF THE INVENTION

The present invention relates to electrical boxes for low voltage wiring, such as coaxial cables, Internet communication wiring, cable television wiring and telephone wiring.

BACKGROUND OF THE INVENTION

Low voltage electrical wiring are used for low voltage electrical applications, such as coaxial cable and/or telephone outlets which is needed in both new building construction (as "new work") or retrofitted in existing buildings. (as "old work").

Traditional utility power supplied higher voltage applications require closed-ended electrical work boxes, which are utilized in buildings to distribute electrical power from the power supply to electrical devices such as outlets or switches.

A traditional electrical workbox includes a metal or plastic housing containing a recess for electrical components such as wire outlets or switches.

Presently, conventional electrical boxes are referred to colloquially as either new workboxes, for new building construction, or old workboxes, for retrofitting into existing buildings.

New workboxes have protruding accessory exterior sheaths for nailing the new workboxes to exposed wood or metal studs within a building. However, because the screw or nail mounting brackets protrude up from the external silhouette shape of the workbox, the brackets interfere with the flush mounting of the workbox within a hole within a building wall.

Moreover, old work boxes are frequently held in place by bent tabs which engage sheetrock boards thus minimizing stability, as the sheetrock is prone to gradually falling apart.

Existing workboxes for low voltage applications mainly include an open frame with a minimum of depth, wherein the frame is attached by fasteners above the confines of the workbox. However, in old work, adding fasteners above and/or below a workbox necessitates the removal of excess wall material, sheet rock, decorative wall coverings, etc.

In some applications, conventional, fairly flat "mud plates" are used to frame out the opening in a wall for low voltage wiring.

Among related patents for fairly flat, frame type openings with external fastener tabs, for low voltage wiring in a wall, include U.S. Pat. Nos. 6,452,813 B1 and 6,452,098 B1, both of Gretz, for terminal devices for low-voltage cable systems. U.S. Pat. No. 6,093,890, also of Gretz, describes a mounting device for low voltage cable wires, which can only be used with old electrical work in existing buildings.

Such prior art workboxes require protruding accessory exterior sheaths for nailing the workboxes to exposed wood or metal studs within a building. However, because the screw or nail mounting brackets protrude up from the external silhouette shape of the workbox, the brackets interfere with the flush mounting of the workbox within a hole within a building wall. Moreover, old work boxes are frequently held in place by bent tabs which engage sheetrock boards thus minimizing stability, as the sheetrock is prone to gradually falling apart.

However, the aforementioned devices are not easily mountable to a stud in a wall, without having exterior fasteners on the frame, and these patents do not describe a low voltage work box for both new and old low voltage electrical work, which is sturdy in construction and which can be easily mounted to a building stud, with minimal damage to surrounding wall surfaces.

An improvement in electrical work boxes for high voltage utility supplied voltage workboxes is shown in Applicant's U.S. Pat. No. 5,600,093 of Herth and Davis, which describes an electrical work box for new work and old work, wherein a novel attachment is described for attaching the electrical work box to a building stud via an angled screw mount within the electrical work box.

However, Herth and Davis '093 describes a closed-ended electrical workbox, which is not needed for low voltage wiring applications.

OBJECTS OF THE INVENTION

It is therefore an object of the present invention to provide a low voltage work box for both new and old low voltage electrical work, which is sturdy in construction and which can be easily mounted to a building stud, with minimal damage to surrounding wall surfaces. It is also an object to provide wide multiple gauge low voltage work boxes.

Other objects which become apparent from the following description of the present invention.

SUMMARY OF THE INVENTION

In keeping with these objects and others which may become apparent, the present invention is a dual purpose low voltage electrical work box typically for coaxial cable and/or telephone outlets, which is equally as useful for new building construction (as a new work box) or retrofit (as an old work box).

The low voltage electrical workbox of the present invention uses internal built-in angled fastener mounting bracket channel sheaths, to avoid the use of any external screw mounting bracket protrusions. These internal angled fastener mounting channel sheaths were first described in the Applicants' earlier U.S. Pat. No. 5,600,093 as attached to a closed-ended electrical box used for house wiring of switches and outlets.

In contrast to Herth and Davis '093, the low voltage workbox of this invention has an open back and is of sturdy molded plastic construction. It accommodates standard low voltage outlet mounting plates.

Since the internal angled fastener brackets accommodate nails, wood screws, or self-tapping screws, mounting to wood, aluminum, or steel studs used in home or commercial construction is easily accomplished.

The low voltage work box of this invention is interchangeable, so that it can be mounted to either the left or right side of a wall stud since the top and bottom have mirror image configurations permitting mounting in the upside down position.

In its preferred embodiment, the terminal or junction box for a low-voltage electrical distribution system structurally includes an outer rectangular mounting plate attached to top and bottom truncated, rectangle walls. Each of these truncated, cut-off walls has a long edge joining top and bottom edges, respectively, of the mounting plate and a front edge at right angles to the long edge. Each of these top and bottom walls includes a short edge, which is parallel to the long edge, extending back from the front edge. This short edge is shorter than the long edge and the top and bottom walls each include a diagonal edge, which extends from a rear end of the short edge, to a shoulder joined to a rear end of the long edge. This shoulder is positioned at a right angle to, and joins a rear end of, the mounting plate.

The low voltage box is open in the front and receives a plate, which encloses the front opening and which provides entry for low voltage wires into the low voltage box.

The low voltage box has an opening between the aforementioned diagonal sides for a distribution network and one or more internal fastener brackets, which are nestled between the shoulder and the mounting plate. These brackets having openings for fasteners at a diagonal to and through the mounting plate, to attach the low voltage box to a stud or other surface.

As a result, the low voltage box is mounted without any external extensions.

Preferably, the low voltage terminal or junction box includes extension plates joining the internal fastener brackets to the mounting plate and the top and bottom walls, respectively, to prevent distortion of the low voltage box.

The low voltage terminal or junction box further optionally includes front plate mounting brackets on the top and bottom walls within the box, and channels extending back from the brackets, along the top and bottom walls, to reinforce the brackets.

In another embodiment, several new features have been incorporated into a generally rectangular molded low voltage box.

Besides internal angled brackets for easy mounting through a wall in old work, an alignment tab which is molded to extend from the outside surface of one of the narrow walls is useful for new work where the wall studs are exposed. It is used to place flush against the narrow front surface of the stud and extends across the stud to rest on the top surface of a previously mounted low voltage or service box. In this way, the new low voltage box is aligned to be mounted at the same height as a previously installed box. After mounting the new low voltage box, the alignment tab is easily snapped off since it is attached by narrow molded strips. This alignment tab is also used to house a pair of detachable (break-off) screw caps which are used to protect internal wiring from the conductive sharp edges of the heads of the mounting screws. They are sized to fit into and are retained by the recess used by a Phillips screwdriver.

A removable bendable back panel is included that will attach to the end of a conduit. This panel is attached by molded ribs along a short wall and along an orthogonal long wall at the rear. The panel can be bent along either a long wall or a short wall of the low voltage box by cutting attachment ribs to the other wall. After one wall attachment is cut, the panel is bent 90 degrees and locked in place by a molded latch feature. The panel is easily removed by cutting both lines of attachment ribs. Internal angled brackets are provided on two orthogonal sides to provide either vertical or horizontal attachment.

A double ganged low voltage box with most of the same features is also described. It has an alignment tab and two separate conduit attachment panels molded to the back. One of the back panels is attached to the top wall by bendable ribs, while the other is attached to the bottom box wall. Both ribs can be deployed and locked at 90 degrees, or one or both can be easily removed by cutting through the attachment ribs.

In a preferred embodiment, the low voltage wiring box includes a pair of substantially parallel side walls wherein each of the side walls has a first end and a second end. A top wall couples the first ends of the sidewalls and a bottom wall couples the second ends of the sidewalls.

A pair of interior brackets are located on at least one wall of the box. Bendable ribs are located on a periphery of the walls. The ribs couple a hinged pane such as a conduit-support-panel that rotates outward from the body of the box. The panel has an aperture within it to permit a piece of conduit or piping to pass therethrough. An optional alignment tab is coupled to the box for aligning the box into a desired position such as to locate the box relative to a wall stud, a plain flat wall of any material, or adjacent to a proximal additional electrical receptacle box, such as one for high-voltage.

BRIEF DESCRIPTION OF THE DRAWINGS

The present invention can best be understood in connection with the accompanying drawings. It is noted that the invention is not limited to the precise embodiments shown in drawings, in which:

FIG. 3 is a top plan view of the dual-purpose low voltage electrical workbox, as in FIG. 2;

FIG. 4 is a front elevational view taken on arrow "4" of FIG. 3, looking into the dual-purpose low voltage electrical work box;

FIG. 13 is a side elevational view of a horizontally oriented low voltage electrical workbox;

FIG. 14 is a top plan view of the low voltage electrical workbox as in FIG. 13;

FIG. 15 is a perspective exploded cutaway view of the present invention, showing the dual purpose low voltage electrical work box mounted horizontally to a structural stud, and showing the face plate in phantom for environmental purposes only;

DETAILED DESCRIPTION OF THE INVENTION

Figure 1:
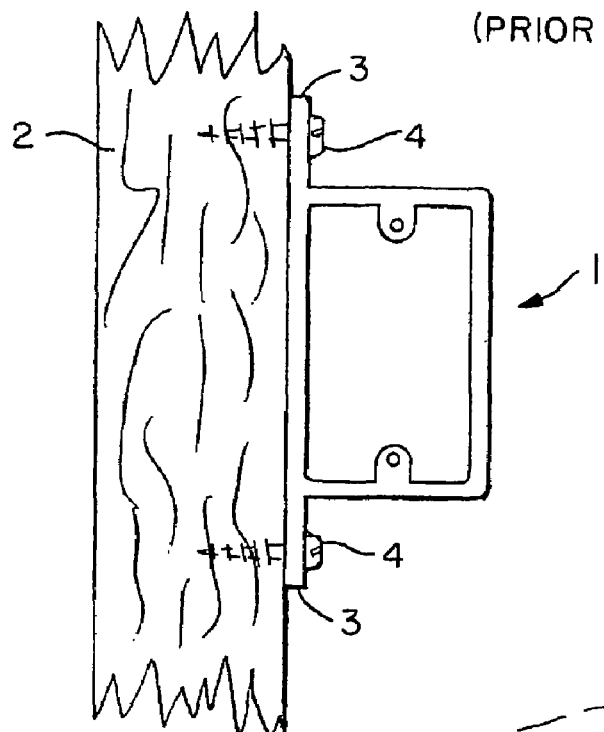
FIG. 1 is a side elevational view of a prior art low voltage electrical workbox.

FIG. 1 shows a prior art low voltage box 1, which is attached to wall stud 2 with screws 4 in brackets 3 protruding from the side of prior art box 1.

FIG. 1 also shows that it would be not be possible to mount prior art box 1 to stud 2 through a rectangular hole in wall sheet rock the size of the box face. Box 1 is therefore used in new construction and is mounted before wall sheeting is installed. It would not be used for retrofit work where an existing wall must be penetrated.

Low voltage box 10 of this invention, as depicted in the various views of FIGS. 2 through 6, is equally useful for new construction as well as retrofit work.

Figure 2:
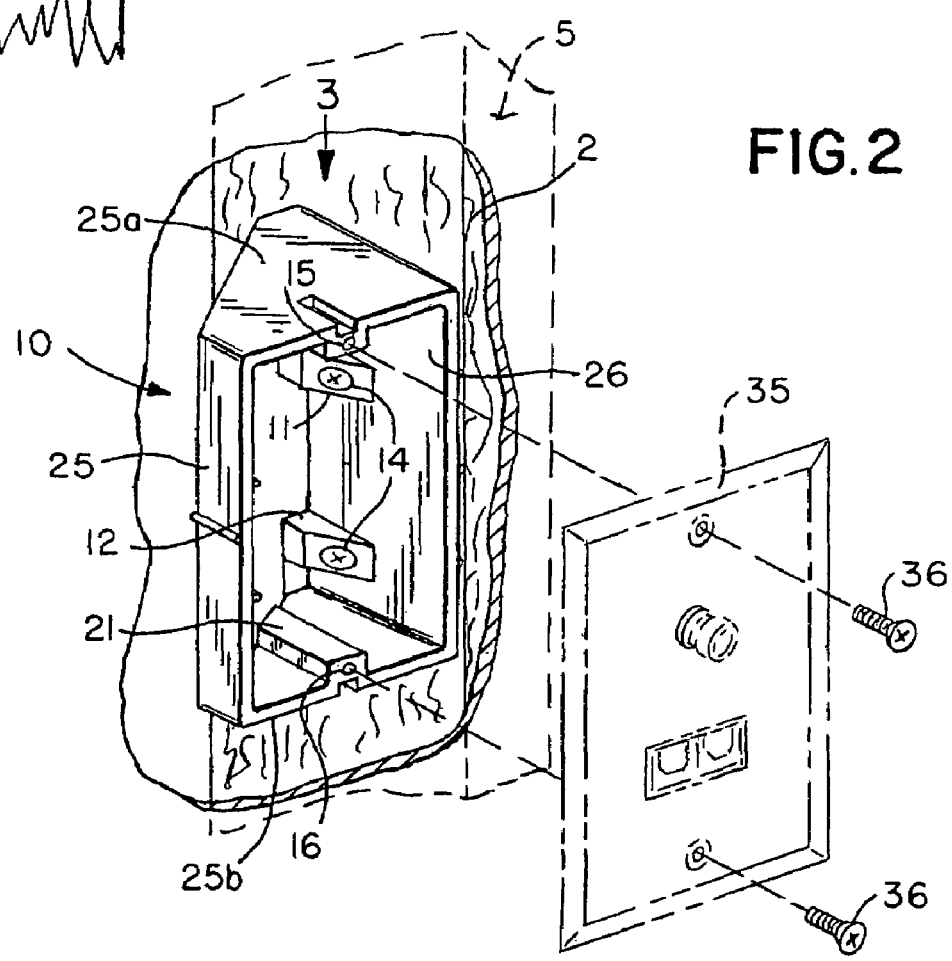
FIG. 2 is a perspective exploded cutaway view of the present invention, showing the dual purpose low voltage electrical work box mounted to a structural stud, and showing the face plate in phantom for environmental purposes only.

As shown in FIG. 2, low voltage box 10 includes primarily a vertically extending fastener wall 26 having a depth deeper than a cantilevered ring edge casing portion, such as horizontally top wall 25a joined by vertically extending distal side wall 25 to lower wall 25b, in a three sided C-shape configuration. Top wall 25a and bottom wall 25b are truncated rectangles, joining the shorter depth distal wall 25 to deeper fastener wall 26.

This configuration of fastener wall 26 having a depth significantly greater than distal wall 25 minimizes the material needed for distal wall 25, while still providing a framed opening for inserting low voltage wires therethrough.

The minimal depth of distal wall 25 also allows for wide access to back opening 17 through which low voltage wires are passed. Likewise, the deeper fastener wall 26 allows for the angled entry of fasteners 14 into stud 26, as described in Applicants' '093 patented electrical work box, but without the closed ended box therein, through which multiple, thick bundles of low voltage wires cannot pass.

However, with such an angled mount, Applicants' low voltage work box 10 avoids the external fasteners disclosed in the prior art low voltage outlet frames, which require protruding accessory exterior sheaths for nailing the work boxes to exposed wood or metal studs within a building, which protrude up from the external silhouette shape of the work box and which interfere with the flush mounting of the work box within a hole within a building wall.

Moreover, the present invention avoids the problem of old work boxes being held in place by bent tabs, which engage sheetrock boards thus minimizing stability, as the sheetrock is prone to gradually falling apart.

Low voltage box 10 can be easily installed through a rectangular hole in wall 5, as in FIG. 2, by using mounting screws 14 in two internal angled brackets 11 and 12 for attachment to stud 2. Top and bottom plate mount brackets 15 and 16 respectively accept plate screws 36 to attach plate 35 which may have coaxial cable outlets, telephone outlets, or one of each as shown.

The top plan view of FIG. 3 shows the location of back opening 17, short side 25 and deep side 26 through which fasteners 14 emerge.

The front view of FIG. 4 shows top angled fastener bracket 11 emerging from wall 26 and further reinforced with extension plate 30 molded so as to rigidly attach wall 26 to the top of box 10, thereby resisting "parallelogram" distortion. A similar plate 30 on the bottom ties wall 26 to the bottom of box 10 and reinforces bottom angled bracket 12; this also keeps box 10 square at the corner.

Figure 5:
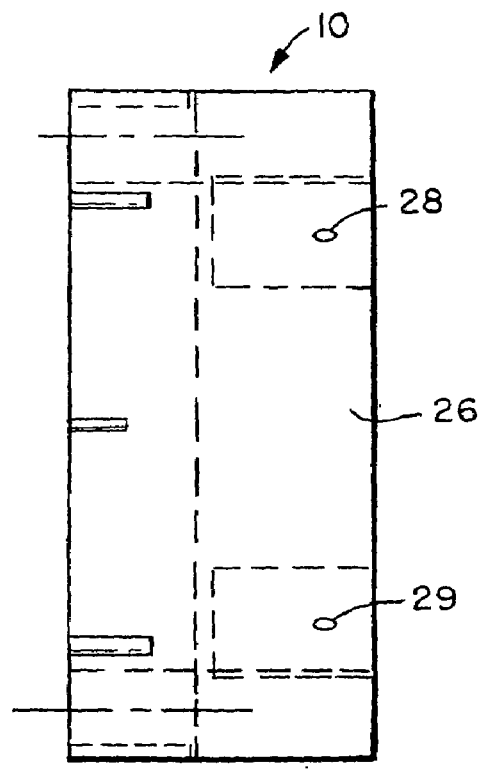
FIG. 5 is a right side elevational view thereof, taken in the direction of arrow "5" of FIG. 4.

The side view of FIG. 5 shows holes 28 and 29 through side 26; these are the exit holes of angled brackets 11 and 12 respectively for fasteners 14.

Figure 6:
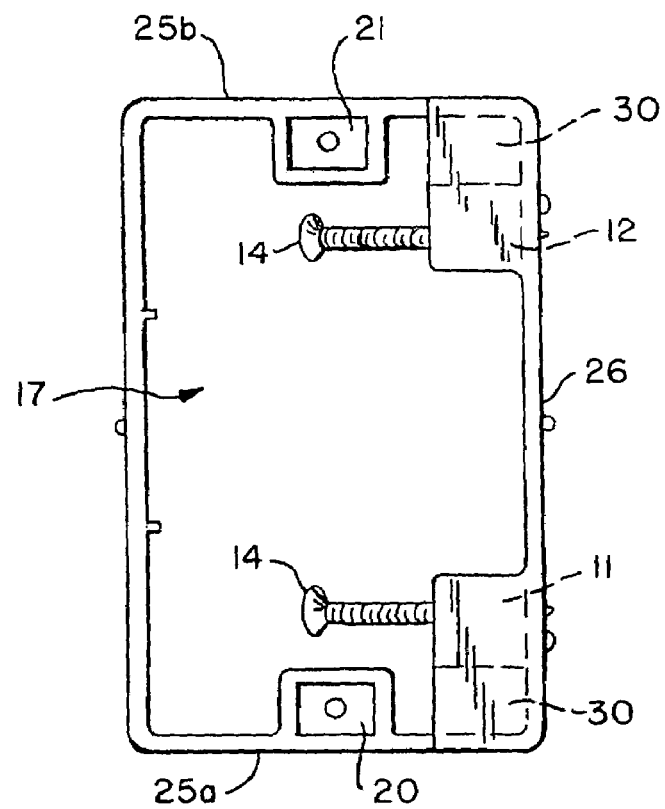
FIG. 6 is a rear elevational view thereof, taken in the direction of arrow "6" of FIG. 3.

The rear view of FIG. 6 shows hollow channels 21 and 20 at the top 25a and at the bottom 25b, respectively, molded so as to reinforce plate-mounting brackets 15 and 16 respectively.

Figure 7:
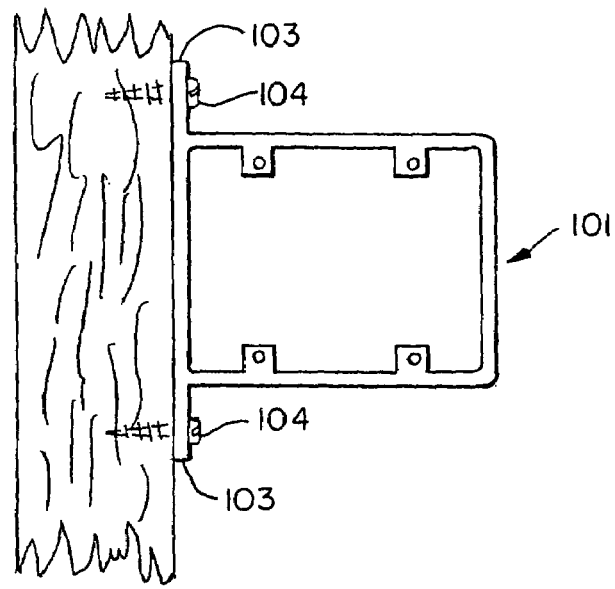
FIG. 7 is a side elevational view of a prior art two gang low voltage electrical workbox.

FIG. 7 shows a prior art two gang low voltage box 101, which is attached to wall stud 102 with screws 104 in brackets 103 protruding from the side of prior art box 101.

FIG. 7 also shows that it also would be not be possible to mount prior art box 101 to stud 102 through a rectangular hole in wall sheet rock the size of the box face. Box 101 can only be used in new construction and is mounted before wall sheeting is installed. It can not be used for retrofit work where an existing wall must be penetrated.

Low voltage box 110 of this invention, as shown in FIGS. 8 through 12, can be used for new work construction as well as retrofit work.

Figure 8:
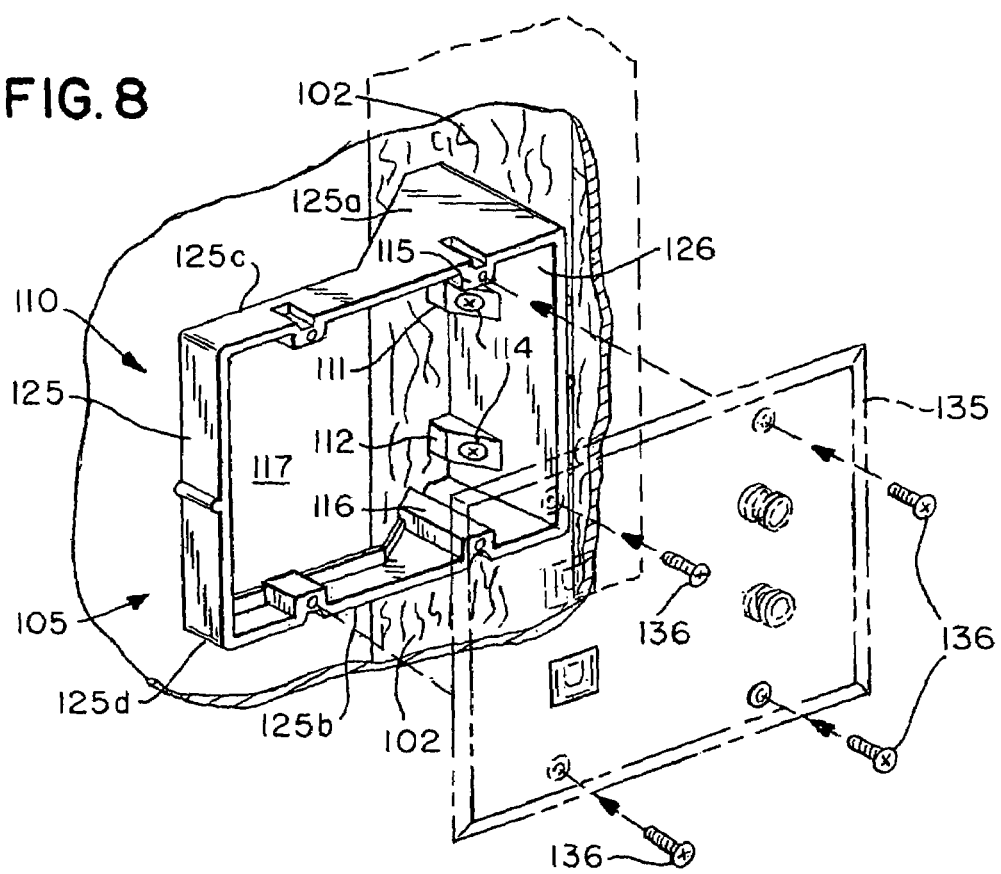
FIG. 8 is a perspective exploded cutaway view of a two gang embodiment of the present invention, showing the dual purpose, two gang low voltage electrical work box mounted to a structural stud, and showing the dual face plate in phantom for environmental purposes only.

As shown in FIG. 8, low voltage box 110 includes primarily a vertically extending fastener wall 126 having a depth deeper than a cantilevered ring edge casing portion, such as horizontally top wall 125a joined by vertically extending distal side wall 125 to lower wall 125b, in a three sided squared-off C-shape configuration. Top wall 125a and bottom wall 125b are truncated rectangles with extension wings 125c and 125d, joining the shorter depth distal wall 125 to deeper fastener wall 126.

This configuration of fastener wall 126 having a depth significantly greater than distal wall 125 minimizes the material needed for distal wall 125, while still providing a framed opening for inserting low voltage wires therethrough.

The minimal depth of distal wall 125 also allows for wide access to back opening 117 through which low voltage wires are passed. Likewise, the deeper fastener wall 126 allows for the angled entry of fasteners 114 into stud 102, but without the closed ended box therein, through which multiple, thick bundles of low voltage wires cannot pass.

However, with such an angled mount, Applicants' low voltage work box 110 avoids the external fasteners disclosed in the prior art low voltage outlet frames, such as in FIG. 7, which require protruding accessory exterior sheaths for nailing the work boxes to exposed wood or metal studs within a building, which protrude up from the external silhouette shape of the work box and which interfere with the flush mounting of the work box within a hole within a building wall.

Moreover, the present invention-avoids the problem of old work boxes being held in place by bent tabs, which engage sheetrock boards thus minimizing stability, as the sheetrock is prone to gradually falling apart.

Low voltage box 110 can be easily installed through a rectangular hole in wall 105, as in FIG. 8, by using mounting screws 114 in two internal angled brackets 111 and 112 for attachment to stud 102. Top and bottom plate mount brackets 115 and 116 respectively accept plate screws 136 to attach plate 135 which may have coaxial cable outlets, telephone outlets, or one of each as shown.

Figure 9:
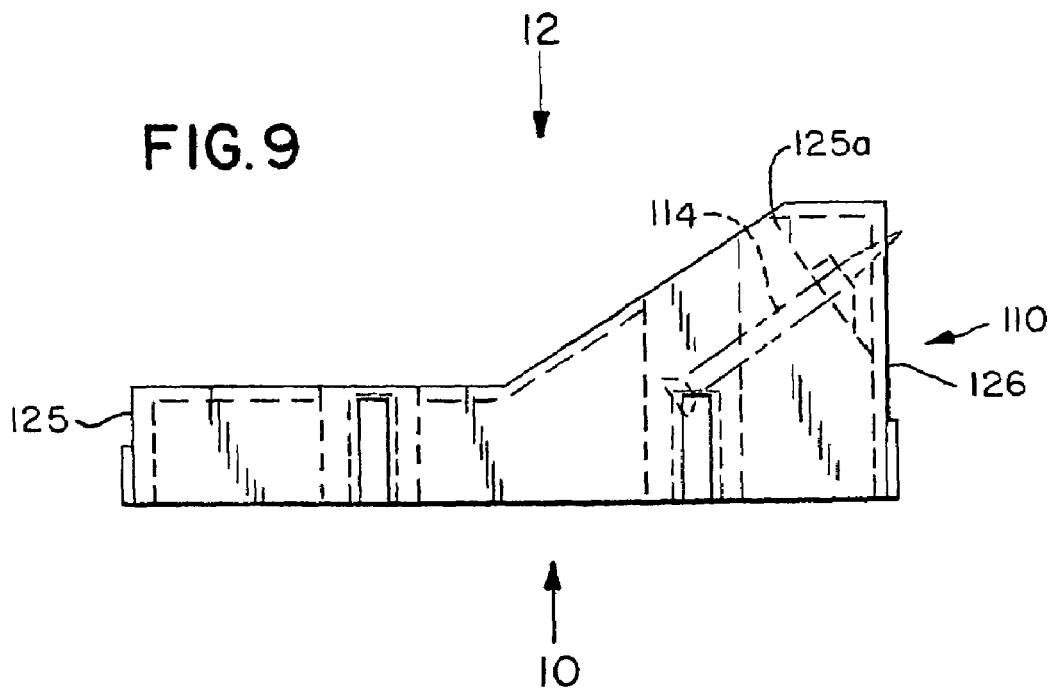
FIG. 9 is a top plan view of the dual-purpose, two gang, low voltage electrical workbox, as in FIG. 8.

The top plan view of FIG. 9 shows the location of back opening 117, short side 125 and deep side 126 through which fasteners 114 emerge. Top wall 125*a* is increased in width by wing 125*c* to accommodate two gang cover 135.

Figure 10:
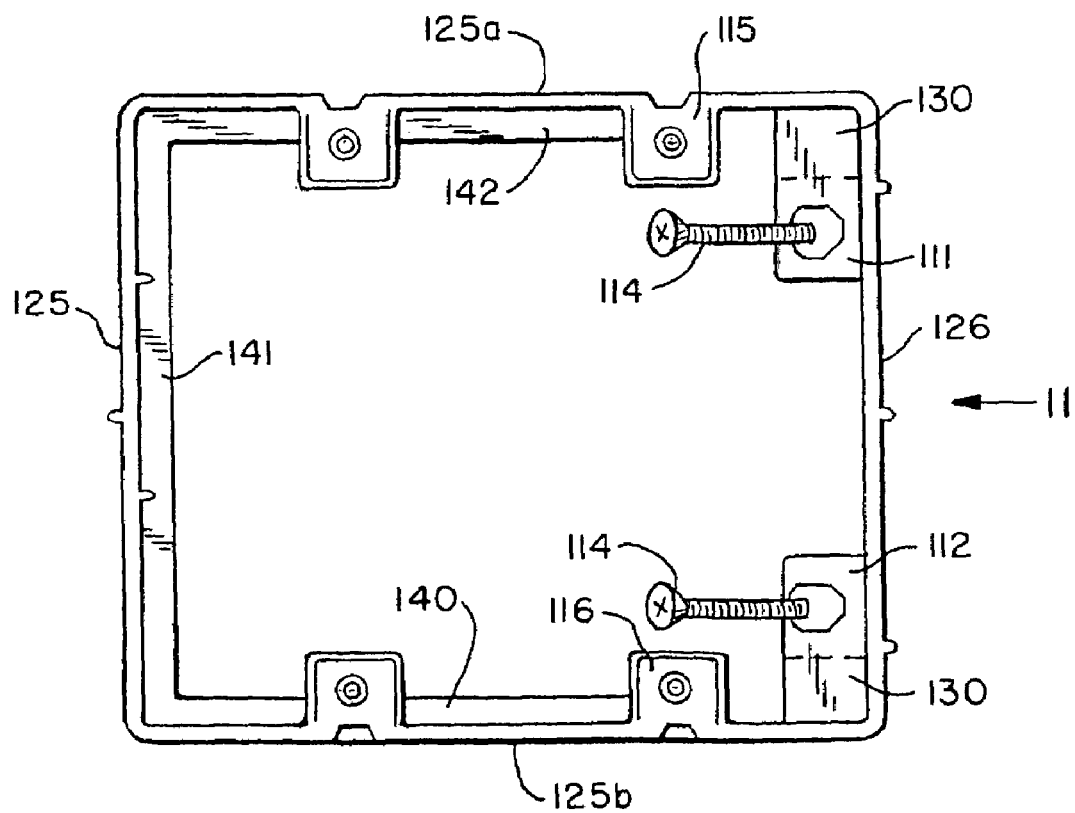
FIG. 10 is a front elevational view taken on arrow "10" of FIG. 9, looking into the dual-purpose, two gang low voltage electrical work box.

The front view of FIG. 10 shows top angled fastener bracket 111 emerging from wall 126 and further reinforced with extension plate 130 molded so as to rigidly attach wall 126 to the top of box 110, thereby resisting "parallelogram" distortion. A similar plate 130 on the bottom ties wall 126 to the bottom of box 110 and reinforces bottom angled bracket 112; this also keeps box 110 square at the corner.

Figure 11:
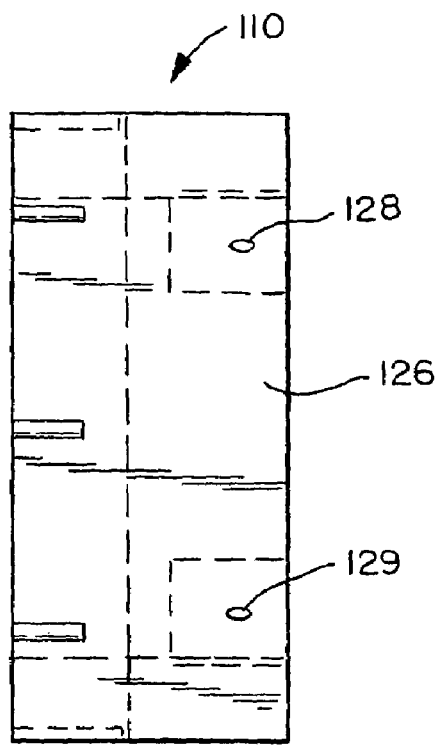
FIG. 11 is a right side elevational view thereof, taken in the direction of arrow "11" of FIG. 10.

The side view of FIG. 11 shows holes 128 and 129 through side 126; these are the exit holes of angled brackets 111 and 112 respectively for fasteners 114.

Figure 12:
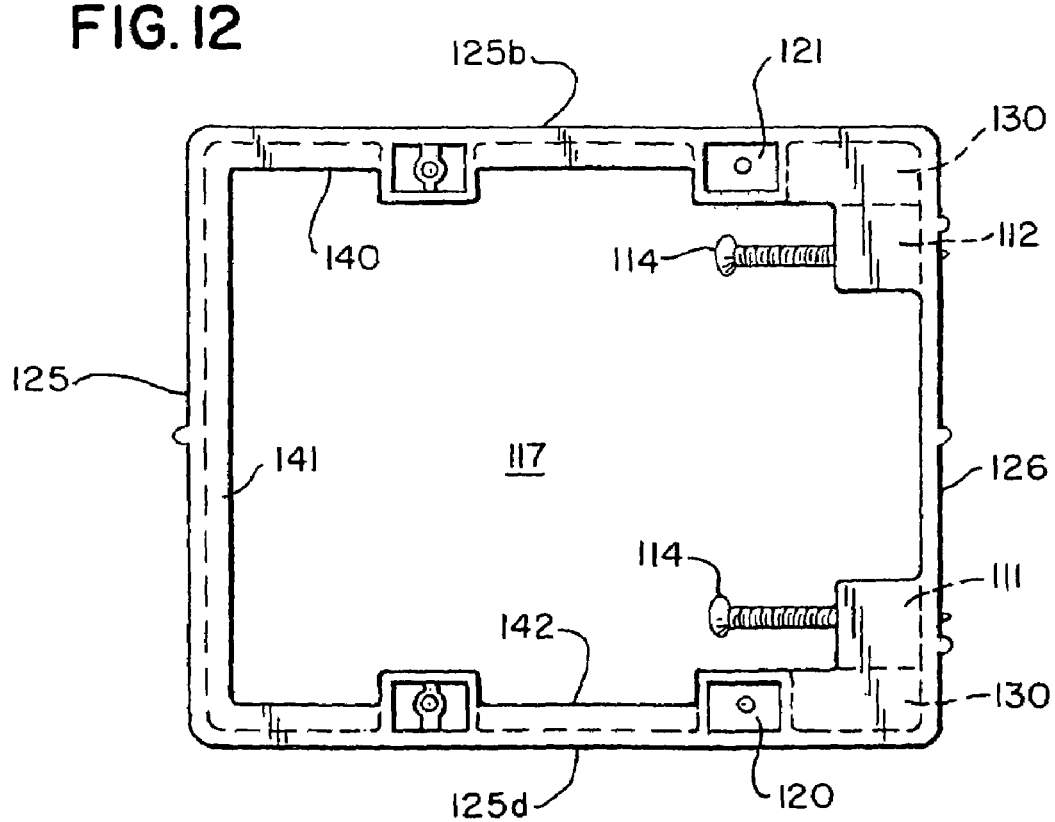
FIG. 12 is a rear elevational view thereof, taken in the direction of arrow "12" of FIG. 10.

The rear view of FIG. 12 shows that rear top and bottom frame brackets 140, 141 add rigidity to rearwardly hollow channels 120 at the top and 121 at the bottom molded so as to reinforce plate-mounting brackets 115 and 116 respectively.

While FIGS. 1–6 depict a single gang low voltage box and FIGS. 7–12 depict wider two gang low voltage boxes, it is noted that other configurations may be provided, such as triple gang low voltage boxes where three groups of low voltage wires are attached to a wide low voltage cover plate.

In addition, as shown in FIGS. 13–15, low voltage box 10 includes primarily a vertically extending fastener wall 26 having a depth deeper than a cantilevered ring edge casing portion, such as horizontally top wall 25*a* joined by vertically extending distal side wall 25 to lower wall 25*b*, in a three sided C-shape configuration. Top wall 25*a* and bottom wall 25*b* are truncated rectangles, joining the shorter depth distal wall 25 to deeper fastener wall 26.

This configuration of fastener wall 26 having a depth significantly greater than distal wall 25 minimizes the material needed for distal wall 25, while still providing a framed opening for inserting low voltage wires therethrough.

The minimal depth of distal wall 25 also allows for wide access to back opening 17 through which low voltage wires are passed. Likewise, the deeper fastener wall 26 allows for the angled entry of fasteners 14 into stud 26, as described in Applicants' '093 patented electrical work box, but without the closed ended box therein, through which multiple, thick bundles of low voltage wires cannot pass.

With such a horizontally angled mount of FIGS. 13–15, Applicants' low voltage work box 10 avoids the external fasteners disclosed in the prior art low voltage outlet frames, which require protruding accessory exterior sheaths for nailing the work boxes to exposed wood or metal studs within a building, which protrude up from the external silhouette shape of the work box and which interfere with the flush mounting of the work box within a hole within a building wall.

Moreover, the present invention avoids the problem of old work boxes being held in place by bent tabs, which engage sheetrock boards thus minimizing stability, as the sheetrock is prone to gradually falling apart.

Low voltage box 10 can be easily installed through a rectangular hole in wall 5, as in FIG. 15, by using mounting screws 14 in two internal angled brackets 11 and 12 for attachment to stud 2. Top and bottom plate mount brackets 15 and 16 respectively accept plate screws 36 to attach plate 35 which may have coaxial cable outlets, telephone outlets, or one of each as shown.

The top plan view of FIG. 14 shows the location of back opening 17, short side 25 and deep side 26 through which fasteners 14 emerge.

The front view of FIG. 13 shows top angled fastener bracket 11 emerging from wall 26 and further reinforced with extension plate 30 molded so as to rigidly attach wall 26 to the top of box 10, thereby resisting "parallelogram" distortion. A similar plate 30 on the bottom ties wall 26 to the bottom of box 10 and reinforces bottom angled bracket 12; this also keeps box 10 square at the corner.

Another embodiment of this invention is described in FIGS. 16–20. A double ganged version is shown in FIG. 21.

Figure 16:
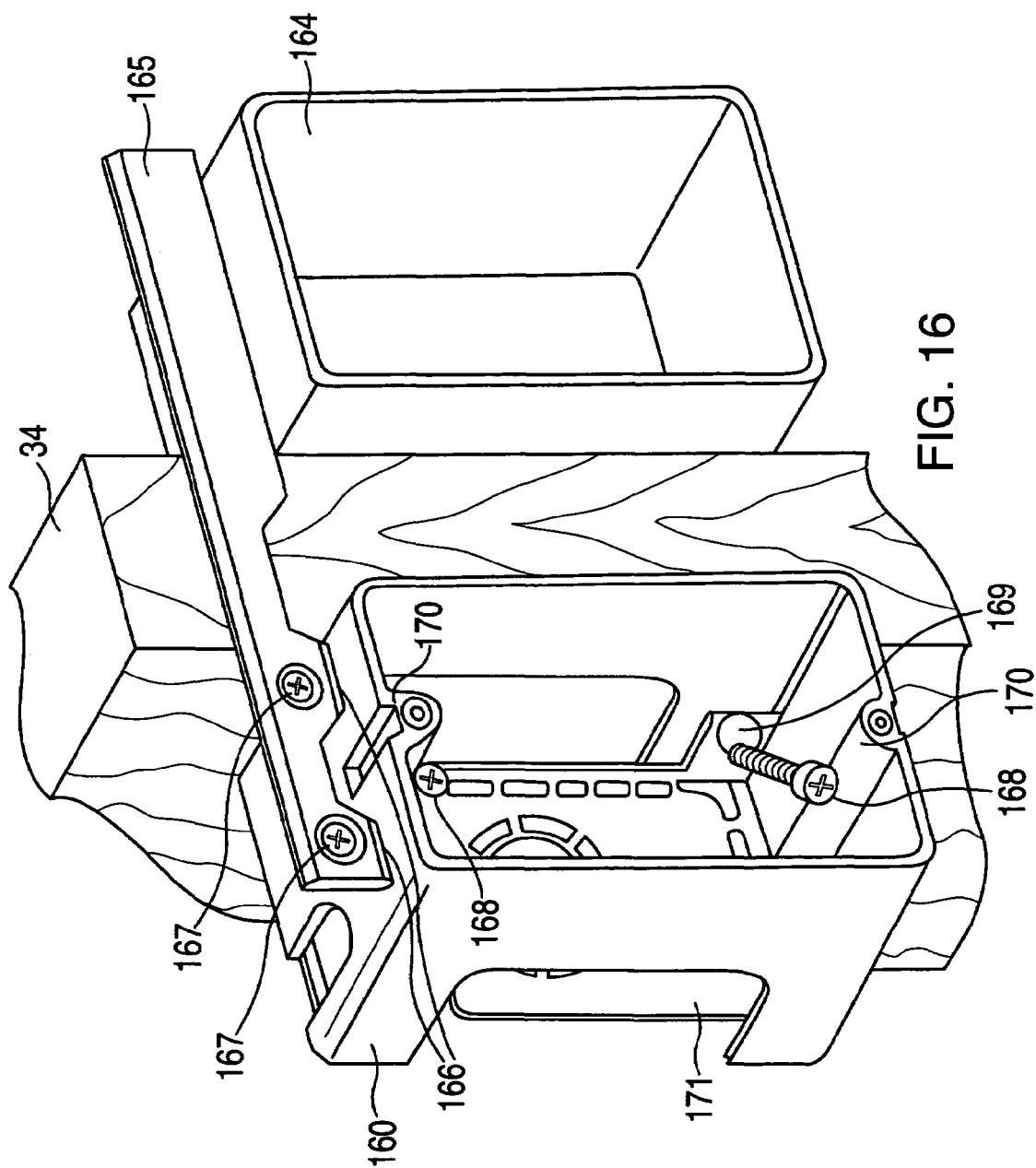
FIG. 16 is a perspective front view of another low voltage box embodiment showing the use of an attached alignment tab.

FIG. 16 illustrates the use of alignment tab 165 attached to low voltage box 160 via narrow mold strips 166. It is placed against the surface of exposed stud 34 and brought down to rest on top of previously attached low voltage or service voltage box 164. This move instantly aligns the height of box 160 to match that of 164 while simultaneously aligning the front surface of box 160 with the front of stud 34. Screws 168 are shown inserted in angled interior brackets 169.

Figure 17:
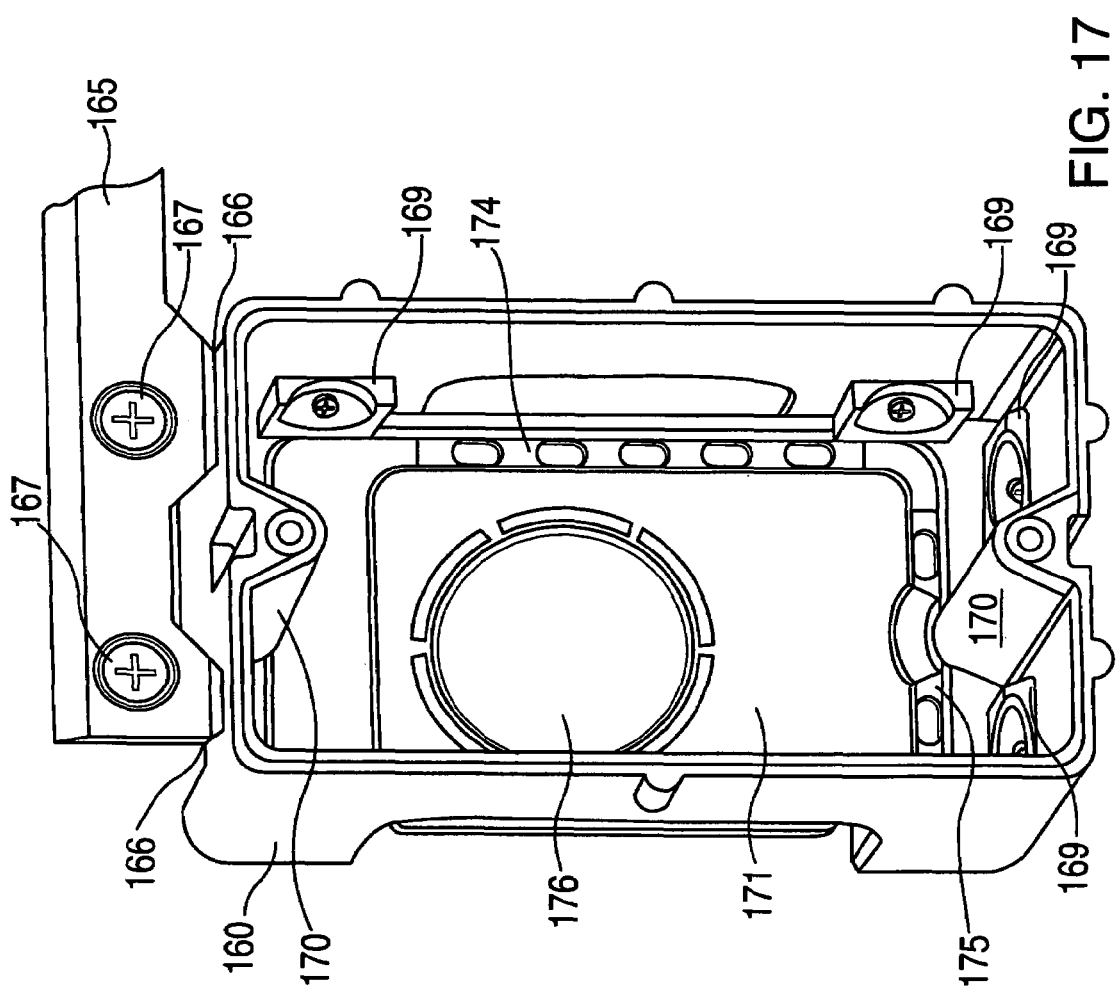
FIG. 17 is a front perspective view of the low voltage box of FIG. 16 from a different viewing angle.

FIG. 17 shows some of the features more clearly. Note that box 160 has angled brackets 169 along both a long wall and a short wall in the preferred embodiment; this permits both vertical and horizontal mounting. Conduit support panel 171 with enlargeable conduit hole 176 is attached to the long side via a line of bendable ribs 174 and to the short side via ribs 175. Detachable (break-off) plastic screw covers 167 are molded as part of detachable (break-off) alignment tab 165. They can be inserted into the Phillips screwdriver recesses in the screw heads to keep internal wires away from the conductive sharp edges of the screw heads. Front panel attachment and reinforcing channels 170 provide structural integrity to box 160.

Figure 18:
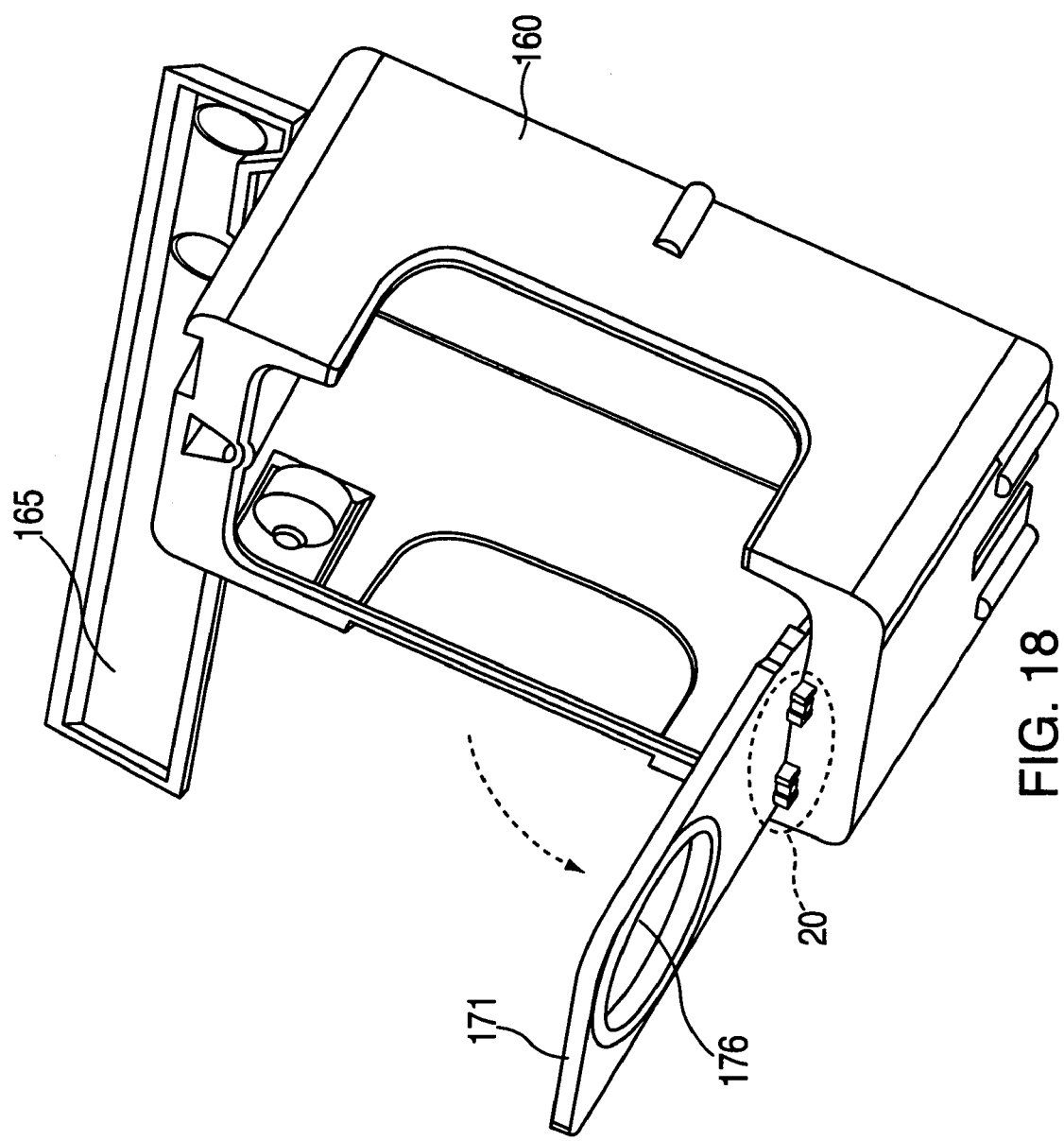
FIG. 18 is a rear side perspective view of another embodiment of the invention showing a conduit support panel in position at 90 degrees from an adjacent narrow wall.
Figure 19:
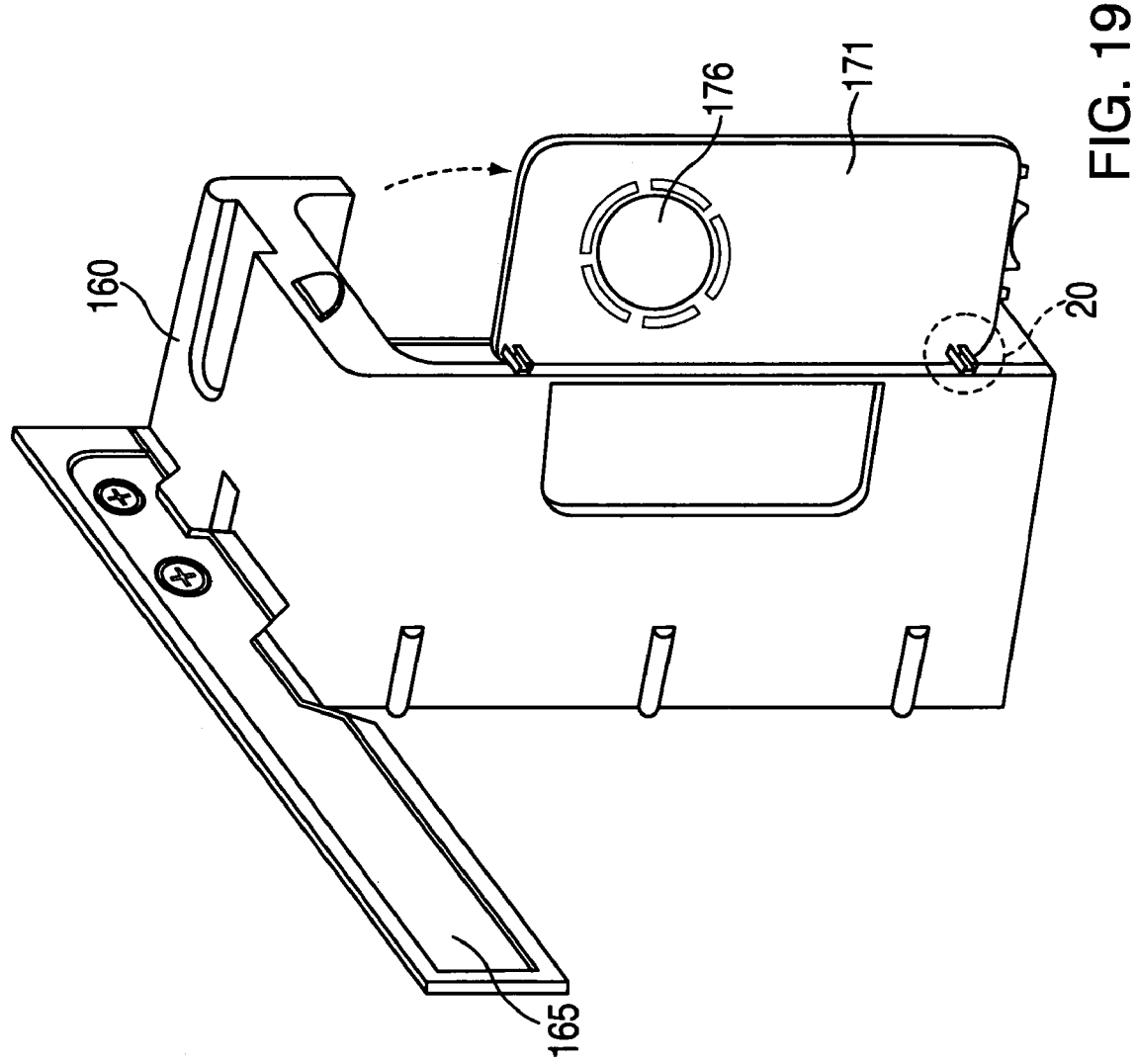
FIG. 19 is a side perspective view of yet another embodiment showing a conduit support panel in position at 90 degrees from an adjacent long wall.

FIGS. 18 and 19 show how conduit support panel 171 can be swung and locked in two different orthogonal directions. This is achieved by cutting through the line of bendable ribs not used prior to bending panel 171 in the desired direction.

Figure 20:
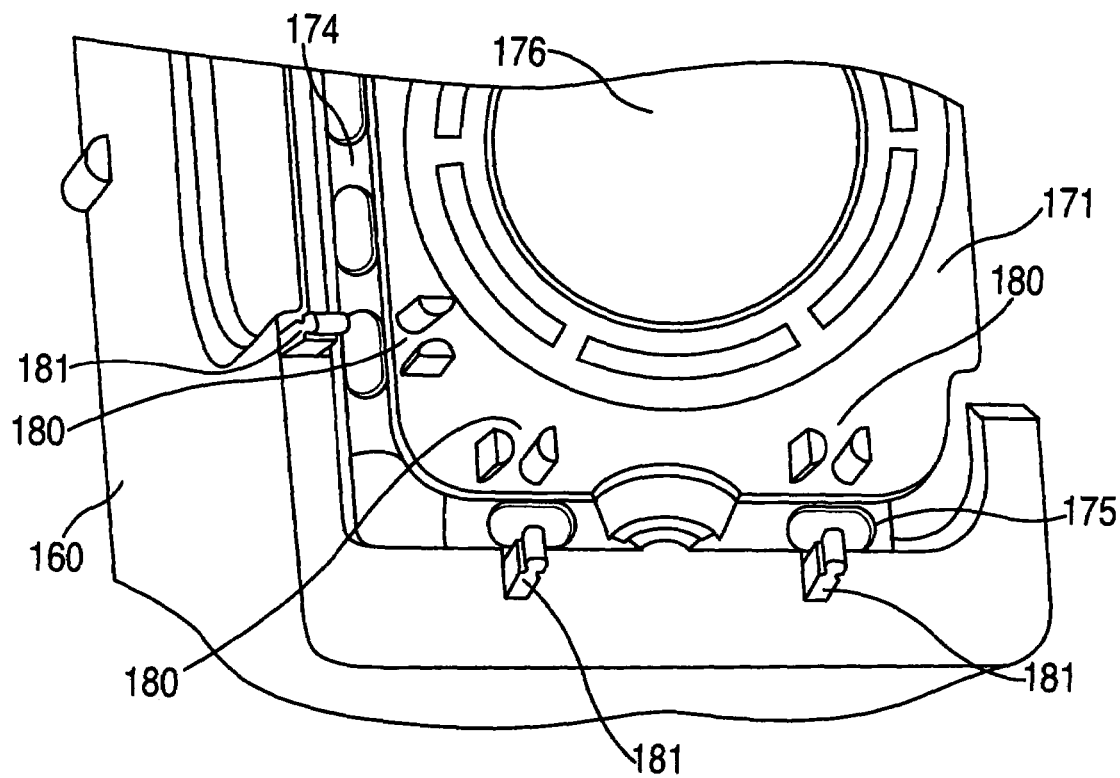
FIG. 20 is another perspective rear view of low voltage box of FIG. 16 showing the molded features which latch the conduit support panel in the deployed positions.
Figure 21:
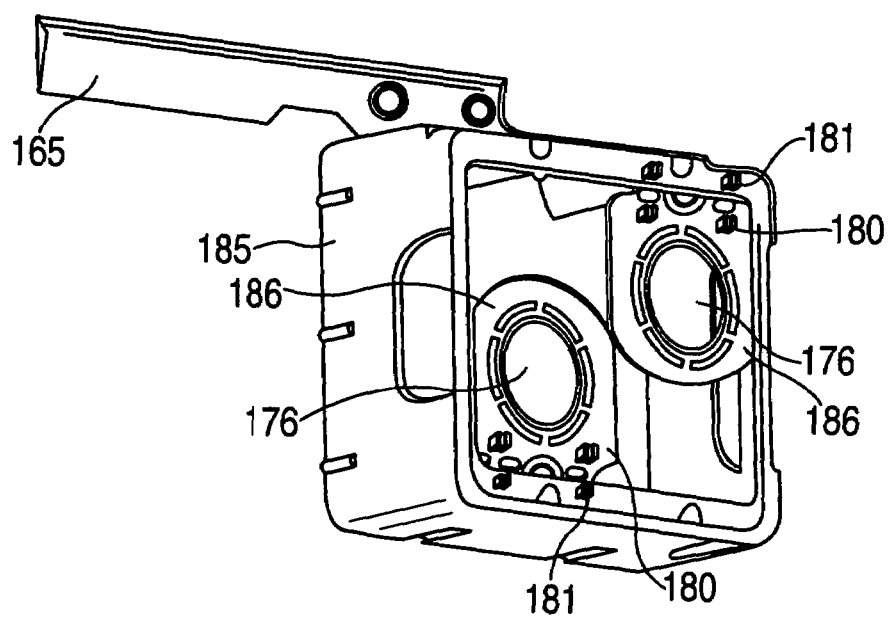
FIG. 21 is a rear perspective view of an embodiment of a double gang low voltage box with alignment tab and dual molded conduit support panels.

The latching details are shown in FIG. 20. Molded pairs of semicircular short rods 180 extend from the surface of panel 171. When panel 171 is bent at 90 degrees from the molded position flush with the rear of box 160, rod pairs 180 will engage rectangular studs 181 emerging from the rear edge of box 160. They will snap into the grooves at each side of studs 181 after elastically deforming briefly.

A double ganged box 185 is shown in FIG. 21. It has two separate conduit support panels 186 attached to the back edge of box 185, one at the top and the other at the bottom. One or both can be folded back 90 degrees and latched using the same mechanisms as described for box 160.

Figure 22:
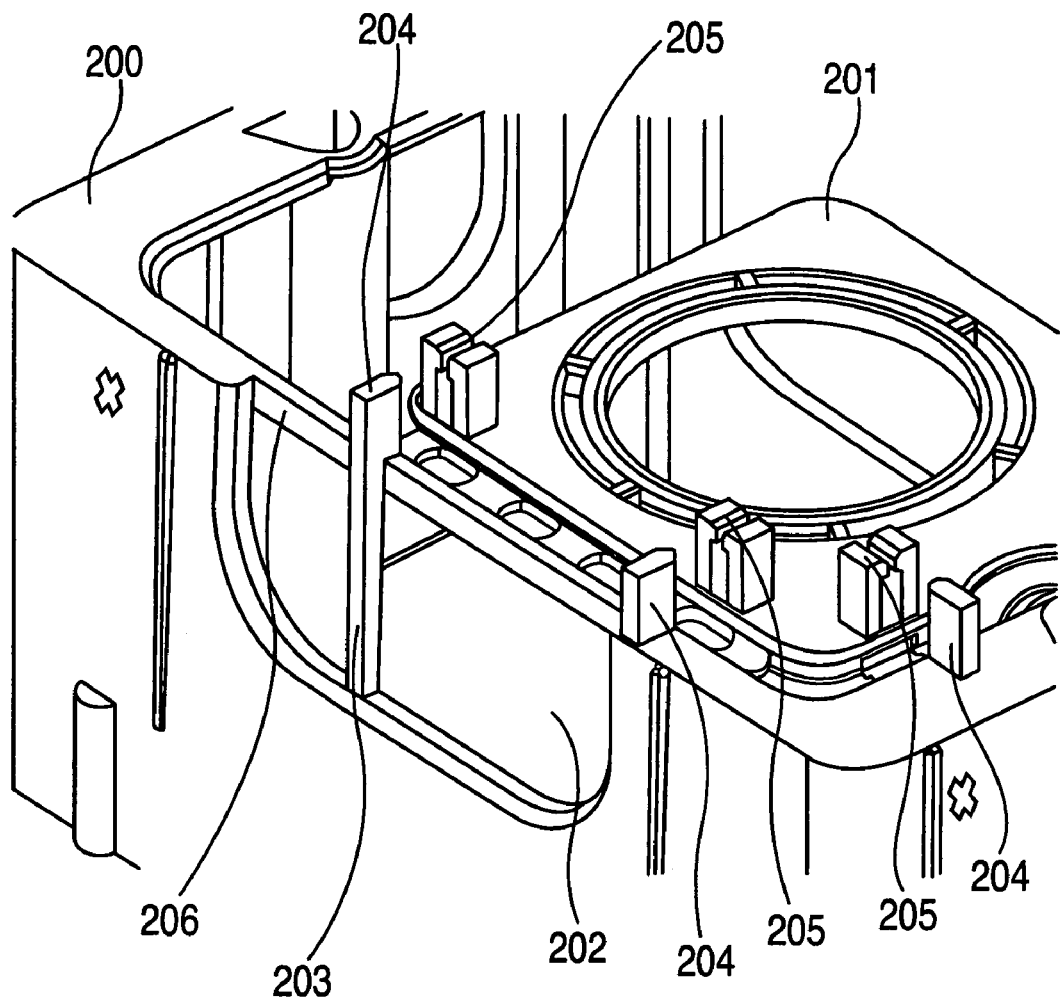
FIG. 22 is a perspective close-up view of another embodiment of a single gang box of the invention; and, FIG. 23 is another close-up view of and embodiment of the invention, as in FIG. 22.

A preferred embodiment 200 of the single box of this invention is shown in the detail of FIG. 22. It uses a shorter conduit support panel 201 as compared to comparable panel 171 of FIGS. 17–19.

While this saves on material cost and results in a more rigid support, it creates another requirement since one of the latching posts 204 now falls within the area of side cut-out 202. A support rib 203 is added in registration with post 204 to strengthen the attachment of post 204 to box 200 beyond that afforded by thin cross-member 206.

Figure 23:
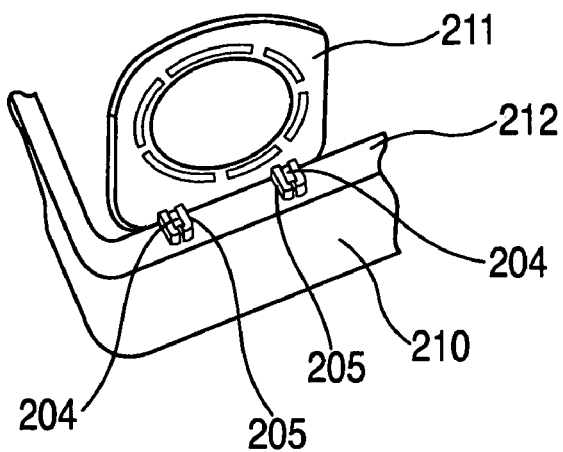

The preferred embodiment also introduces a preferred latching mechanism which is usable also with the double ganged box 210 as shown in FIG. 23.

The unlatched configuration of FIG. 22 shows the latching elements in detail; they include molded spaced-apart pairs of engagement fingers 205 extending from the surface of the conduit support panels (201 or 211) which snap over and retain posts 204 when the panel is rotated 90 degrees as shown in FIG. 23. Posts 204 are attached to surface 212 in FIG. 23.

In the foregoing description, certain terms and visual depictions are used to illustrate the preferred embodiment.

However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing from the scope of the invention, as noted in the appended Claims.

I claim:

1. A dual use terminal or junction box for installation of new electrical work or old electrical work for a low-voltage wiring distribution system comprising:
    a pair of substantially parallel side walls wherein each of said side walls has a first end and a second end;
    a top wall coupling said first ends of said pair;
    a bottom wall coupling said second ends of said pair;
    a pair of interior brackets on at least one wall of said side walls, said top wall, and said bottom wall;
    a reinforcement channel on said top wall and said bottom wall;
    bendable ribs on a periphery of at least one of said walls of said box; and
    at least one hinged pane conduit support panel coupled to said at least one wall via said bendable ribs, wherein said support panel has a conduit-accepting aperture therein.

2. The box of claim 1, further comprising an alignment tab coupled to said top wall.

3. The box of claim 1, further comprising a latching mechanism.

4. The box of claim 1, further comprising:
    a plurality of rod pairs positioned on said support panel; and
    a corresponding stud for each rod pair in said plurality on at least one of said side walls, said top wall, and said bottom wall.

5. The box of claim 4, wherein said rods are semicircular.

6. The box of claim 4, wherein said stud is rectangular.

7. The box of claim 1, wherein said support panel aperture is expandable.

8. The box of claim 1, further comprising a locator-alignment tab coupled to said top wall for locating said box relative to a foundation material to which said box is attached.

9. The low voltage wiring box of claim 8 wherein said foundation material comprises a wall stud to which said box is attached.

10. The low voltage wiring box of claim 8 wherein said foundation material comprises a wall to which said box is attached.

11. The low voltage wiring box of claim 8 wherein said foundation material comprises a separate electrical receptacle box located in close proximity to said low voltage wiring box.

* * * * *